UNITED STATES PATENT OFFICE.

ARTHUR S. FUNK, OF LA CROSSE, WISCONSIN.

PROCESS OF CEMENTING.

1,316,295.   Specification of Letters Patent.   Patented Sept. 16, 1919.

No Drawing.   Application filed April 6, 1917. Serial No. 160,334.

*To all whom it may concern:*

Be it known that I, ARTHUR S. FUNK, a chemist, residing at 1401 Main street, in the city of La Crosse, in the county of La Crosse, State of Wisconsin, U. S. A., have invented certain new and useful Improvements in Processes of Cementing, whereof the following is a full, clear, and accurate specification, sufficient to enable others skilled in the art to which it pertains to make and use the same.

The invention relates to an improved method of cementing flexible materials together whereby the time of the operation is materially reduced, a more uniform result is secured, and the solving materials in the cement may be removed without injuriously affecting users thereof; it also relates to the composition of the cement itself whereby an improved quality of cement is produced.

The resulting cement and the process of its use in more particularly applicable to the cementing together of flexible materials of which rubber is a considerable constituent, as exemplified in the making of rubber shoes, shoes with canvas uppers and rubber soles such as tennis shoes, rubber tires and the like, for which the cemented material is either pure rubber or a rubber composition or a fabric saturated or coated with rubber or rubberized material.

In order that the invention may be clearly understood, it may be desirable to describe the process by which a tennis shoe is usually built up by the cementing together of canvas uppers and rubber soles or soles formed or cut from rubber composition. In the production of such a shoe, the first step is to place a top of canvas over a last, placing the insole on the bottom of the last, and drawing the top over the insole and securing it to the insole by a comparatively thin coating of cement bond, whereby the upper is made to conform to the shape of the last, the wrinkles which form in the canvas along the insole being trimmed off with a knife. The layer of canvas over the insole leaves a hollow in the bottom, which is then filled up with a layer of rubber or similar composition with the insole and is known as filler.

The next operation is known as "cementing", which comprises the application of a thick coat of cement, usually rubber or a rubber composition dissolved in gasolene, over the bottom and up the sides of the shoe to a height of one quarter of an inch to one half inch, as is desired, the side being as nearly parallel with the sole as possible. In order to secure a firm adhesion of the subsequent material, the cement must be of thick consistency, and thickly and evenly applied, as with a brush. The cement to some extent permeates the fibers of the canvas and of the insole fabric, to give a firm and tenacious adhesion of the cement to the canvas. The cement, for this purpose, is a flexible composition solved or cut with high grade gasolene, usually of 65 degree to 72 degree, and a solvent of that high grade is used to secure rapid evaporation of the same when the cement is exposed to the air for drying purpose to render the cement tenaciously adhesive.

After this thick coating of thick cement is applied to the bottom and on the sides, as stated, in the old process the partially finished shoe is then hung up in the open air on a rack in front of the workman to dry, that is to permit the solvent to evaporate out. It requires from one and one half to three or four hours for the solvent to evaporate sufficiently to give the cement the desired adhesive qualities. The evaporated solvent escapes into the air of the room, and slowly from the room by the ventilating means, whatever they may be. When the cement on the shoe has sufficiently dried, a form sole or binder, made of what is called "frictioned fiber" or cloth coated with rubber composition under pressure, and somewhat smaller than the size of the outsole, is securely rolled upon the bottom of the shoe, resting upon the stiffened thick cement on the bottom. A strip of rubber sheet about three quarters of an inch wide is then placed on the thick cement on the sides of the shoe, extending as high as the cement reaches, and is securely rolled or pressed thereto. This last operation is known as "foxing."

After the foxing is completed, a thin coat of cement is applied to the bottom of the shoe and somewhat up on the foxing and to the smooth or upper side of the outsole, and after it is sufficiently dried the outsole is placed in position upon the bottom, with its edge reaching upon the foxing as high as this cement has been applied and pressed with a roller securely in position on the bottom and on the foxing to insure a firm adhesion of all portions of the outsole.

Various other steps in the production of the shoe may be added, according to the character of the shoe to be made, but it is unnecessary to describe them herein. The last step described completes the formation of the essentials of the shoe, which is then ready for varnishing and vulcanization by usual methods.

The invention lies in the production of the cement and the method of drying out the thick coating of cement described.

In practice I have found that after the shoe has been varnished and vulcanized there is frequently more or less of a separation between the foxing and outsole from the thick cement, that is, that there is an imperfect adhesion between these parts and the canvas. Sometimes the imperfection extends quite deeply between the foxing and the material which it adjoins, and sometimes it extends only a short distance in length and depth. But the defect is sufficient to destroy the shoe as a perfect production, and it can be sold only at a considerable reduction in price if it is not too seriously imperfect to be sold at all. I have discovered that in making the cement the solvent does not reduce the material to a homogeneous consistency, but leaves it more or less flaky; and also that it is impossible to force the cement completely into all the interstices of the fabric and between adjoining surfaces, and that, due to both causes, there are little pockets in which the evaporating solvent is imprisoned during the air drying process and from which the imprisoned solvent does not escape, due to the low temperature of the atmosphere, even though the solvent used be gasolene of a high volatile quality that evaporates at comparatively low temperatures, and that while the solvent may tend to escape from its mixture with the cementing material itself it does not freely escape into the air: I have also found that the quality of the solving gasolene heretofore used is quite obnoxious and injurious to the workmen, and I have found that by using a solvent, such as gasolene, or other petroleum product, of a lower volatile quality, the solving quality will be sufficient without penetrating so deeply into the interstices of the material of the shoe while permitting of satisfactory adhesion, and is not so deleterious to the health and comfort of the workmen.

But I also have found that I can completely avoid all of the difficulties attending the air drying of the cement by subjecting the shoes to artificial heat after the thick cement has been applied and before the foxing is put on the shoe. This I accomplish by passing the shoes, after the cement is applied, into the vulcanizing chamber and subjecting them there to heat at a temperature of about 150° to 160° F., but in all cases at less than a vulcanizing temperature. This high temperature effectively drives out the solving substance within a period of from one-half to three-quarters of an hour, leaving none of the fluid in the pockets and interstices, with the result that when the shoe is completed and has been vulcanized, all of the imperfections heretofore experienced have been eliminated, and the vulcanization itself is of a superior quality. By this improved process of drying the fumes of the solvent during the drying are kept from distribution in the work room, the drying process has been reduced one to three hours, and the necessity for using high priced solvent has been obviated, the workmen can turn out more work in a day or they can turn out their daily allotment in much less time, and the shoes come out in perfect form without blemish.

In practice, I find that I can use gasolene, or naphtha, or benzene, of low grade, of 58 deg. to 60 deg., for, in the artificial heating process the heavier solvent will be driven out about as rapidly as the lighter solvent; which is a strong advantage in view of the fact not only of lower price, but that the lower grade can always be readily obtained, while the higher grades are frequently very scarce and difficult to obtain. Another advantage in the use of the lower grade of solvent is that there is less loss in the handling and storage of the heavier due to less atmospheric evaporation from the containing packages.

While I have described the advantages of using the improved cement and the process of using it as applied to the manufacture of a particular style of shoe, the invention can be equally well applied to a large number of other objects of manufacture, such as rubber tires for vehicles, rubber hose, and the like.

Having described my invention, what I claim is:

1. A process of cementing flexible materials together which consists in applying to one of the materials a thick coating of flexible cementing substance adhesive when cold solved with a volatile fluid, subjecting the coated material to an artificial heated air substantially at rest until completely freed from the volatile fluid, and pressing the materials together thereafter with the cementing substance therebetween.

2. A process of cementing flexible materials together which consists in applying to one of the materials a coating of heavy cement comprising rubber solved with gasolene or other volatile petroleum product, and subjecting the material covered with cement to an artificial inclosed heat at less than vulcanizing temperature for a sufficient length of time to evaporate the solvent, and subsequently pressing the materials together with the cement coat therebetween.

3. A process of cementing flexible materials together which consists in applying to one of the materials a thick coating of cement comprising rubber solved with gasolene or other volatile petroleum product of 58° to 60° test to form a heavy cement, subjecting the cement covered material to an artificial heat of approximately 150° to 160° for a period of from one half to three quarters of an hour, and pressing the materials together after the heating treatment with the cement coating therebetween.

4. A process of cementing flexible materials together without detriment to workers which consists in applying to one of the materials a thick coating of cement comprising rubber solved with gasolene or other volatile petroleum product of 58° to 60° in quantity sufficient to form a thick cement, subjecting the cement covered material to an artificial heat of approximately 150°, in a closed chamber and subsequently pressing the materials together with the cement coat therebetween.

5. A process of cementing flexible materials together which consists in applying to one of the materials a coating of cement comprising cementing substance adhesive when cold solved with a volatile fluid, subjecting the cement covered material to artificial heat in a closed chamber containing air heated to an abnormal temperature to evaporate the volatile fluid, removing said material from the chamber and pressing the materials together subsequently to the heat treatment with the cementing substance between the materials, the coated material remaining stationary during the heating treatment.

6. A process of cementing materials together which consists in applying to one of the materials a thick coating of cementing substance adhesive when cold rendered miscible by solving with a volatile fluid, subjecting the coated material to an artificially heated atmosphere to evaporate the volatile fluid, and pressing the uncoated material upon the cement coat subsequently to the heating treatment, the cementing substance being at ordinary atmospheric temperature during the pressing process.

7. A process for cementing materials together which consists in applying to one of the materials a thick coating of cementing substance adhesive when cold rendered miscible by solving with a volatile fluid, subjecting the coating material to inclosed artificial heat at higher than normal atmospheric temperature to evaporate the volatile fluid, and pressing the uncoated material upon the cementing substance subsequently to the heating treatment, the coated material remaining stationary during the heating process.

8. A process of cementing materials together which consists in applying to one of the materials a thick coating of cementing material adhesive when cold and nonmiscible by heat at ordinary atmospheric temperature, rendering same miscible by solving with a volatile fluid, subjecting the coated material to artificial heat above normal temperature to evaporate the volatile fluid from the cementing substance, and pressing the uncoated material upon the cementing substance subsequently to the heating process, and when said substance is at normal temperature.

9. A process of cementing small pieces of materials together which consists in applying to one of each set of a plurality of sets of pieces a thick coating of flexible cementing substance adhesive when cold and solved with a volatile fluid, subjecting a plurality of coated pieces simultaneously to artificially heated air substantially at rest until free from the volatile fluid, and pressing the sets of pieces together when the cementing substance is cold, with the cementing substance therebetween.

10. A process of cementing small pieces of materials together which consists in applying to one of each set of a plurality of sets of pieces a thick coating of flexible cementing substance adhesive when cold and solved with a volatile fluid, subjecting a plurality of coated pieces simultaneously to artificially heated air substantially at rest until freed from the volatile fluid and subsequently removing the coated pieces from the heat and pressing the sets of pieces together with the cementing substance therebetween.

ARTHUR S. FUNK.